(12) United States Patent
Hou et al.

(10) Patent No.: US 8,560,940 B2
(45) Date of Patent: Oct. 15, 2013

(54) DETECTING REPEAT PATTERNS ON A WEB PAGE USING SIGNALS

(75) Inventors: Hui-Man Hou, Beijing (CN); Jian-Ming Jin, Beijing (CN); Li-Mei Jiao, Beijing (CN); Suk Hwan Lim, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 80 days.

(21) Appl. No.: 13/220,351

(22) Filed: Aug. 29, 2011

(65) Prior Publication Data

US 2013/0031461 A1    Jan. 31, 2013

(51) Int. Cl.
*G06F 17/00* (2006.01)
(52) U.S. Cl.
USPC .......................................................... 715/234
(58) Field of Classification Search
USPC .......................................................... 715/234
See application file for complete search history.

(56) References Cited

U.S. PATENT DOCUMENTS

| | | | |
|---|---|---|---|
| 7,783,614 B2 | 8/2010 | Jones et al. | |
| 7,853,871 B2 | 12/2010 | Simons et al. | |
| 7,861,151 B2 | 12/2010 | Milic-Frayling et al. | |
| 7,877,677 B2 | 1/2011 | Wyler et al. | |
| 7,913,163 B1 | 3/2011 | Zunger | |
| 7,917,755 B1 | 3/2011 | Giliyaru et al. | |
| 7,954,053 B2 | 5/2011 | Orelind et al. | |
| 7,970,853 B2 | 6/2011 | Simpson | |
| 7,974,934 B2 | 7/2011 | Ravikumar et al. | |
| 7,987,417 B2 | 7/2011 | Chakrabarti et al. | |
| 2004/0249979 A1* | 12/2004 | Yamaguchi et al. | 709/246 |
| 2005/0038635 A1* | 2/2005 | Klefenz et al. | 702/189 |
| 2011/0145249 A1 | 6/2011 | Joshi et al. | |
| 2012/0215523 A1* | 8/2012 | Inagaki | 704/9 |

\* cited by examiner

*Primary Examiner* — Doug Hutton, Jr.
*Assistant Examiner* — Andrew McIntosh

(57) ABSTRACT

An exemplary embodiment of the present may generate a DOM-tree and generate a signal based on the DOM-tree and a node list. The signal may be analyzed and nodes may be selected within the signal to form a periodic wave. Repeat patterns may be detected using the periodic wave and the nodes.

20 Claims, 8 Drawing Sheets

400

500

800

DETECTING REPEAT PATTERNS ON A WEB PAGE USING SIGNALS

BACKGROUND

CROSS-REFERENCE TO RELATED APPLICATION

This application claims priority to Chinese (CN) Patent Application No. 201110215012.2, filed on Jul. 29, 2011, the contents of which are incorporated by reference as if set forth in their entirety herein.

Information on web pages is typically rendered using fixed templates, or patterns. The patterns may appear repeatedly on a web page, and are often referred to as repeat patterns. Web pages may be segmented based on the patterns found on the web page. For example, a segment may be a navigation bar, header, footer, advertisements, related links, copyright information, or the actual web page content itself. Identifying the patterns within a web page is useful in many applications, such as displaying the web page on small screen devices, data mining, search engines, and print devices. Further, identifying the repeat patterns may provide information regarding the web page design, the structure of the web page, and the content contained on the web page.

In order to identify and retrieve content from a web page, web page segmentation algorithms may cluster similar elements. In these algorithms, groups of elements that repeat may not be clustered, since the elements that repeat may not be similar at all. Accordingly, repeating patterns may not be detected among the clustered elements and information conveyed by the repeating patterns may be lost.

BRIEF DESCRIPTION OF THE DRAWINGS

Certain exemplary embodiments are described in the following detailed description and in reference to the drawings, in which.

DETAILED DESCRIPTION OF SPECIFIC EMBODIMENTS

Detecting repeated elements on a web page enables the repeated elements to be grouped into repeat patterns. An embodiment includes a system that can detect a repeat pattern on a web page using a signal analysis approach, including generating the signal using a web page document object model (DOM) in a tree data structure. A DOM is a cross-platform and language-independent convention for representing and interacting with objects in various markup language documents. Aspects of the DOM, such as its elements, may be addressed and manipulated. An element is an individual component of the particular markup language used. A DOM-tree renders these elements as nodes within a tree. A node may also correspond to a small unit of data that resides on a web page.

Various techniques for web page segmentation can use a tree matching algorithm to identify the repeat patterns and then use alignment information to filter out the unwanted data. A global optimal solution may be obtained from a local optimal solution by traversing each node using a bottom-up order in the DOM-tree. However, the bottom-up traversal is recursive, and such recursive computing can be time consuming. Further, the repeat patterns may not be detected if they are not fully displayed, such that one sub-tree does not contain some nodes of the pattern, but is in fact a pattern of the web page.

Other techniques for web page segmentation may use a dummy tree matching algorithm to check the similarity of data records within a DOM-tree by examining the distinct tags and then comparing the total number of distinct tags in all levels of the DOM-tree. However, this technique may also suffer when one sub-tree does not contain all nodes of the pattern. Similarly, using visual consistency to locate and extract patterns or data regions may not work well if the data records have different attributes.

In embodiments, repeat patterns may be detected in a robust manner, regardless of the number of nodes in a repeat pattern or if the data records have different attributes. Additionally, repeat patterns may be detected even if they are not fully displayed on the web page. Further, signal analysis techniques such as Fast Fourier Transform (FFT), Digital Wavelet Transform (DWT), autocorrelation, or any other time-frequency analysis technique may be used to analyze the signal. Through the present techniques, the web repeat pattern detection problem may be solved as a signal analysis problem, wherein signal analysis techniques are used to obtain an accurate and robust result. The results may be useful in web page printing and web content extraction, as the repeat patterns may be used to segment the web page.

Figure 1:
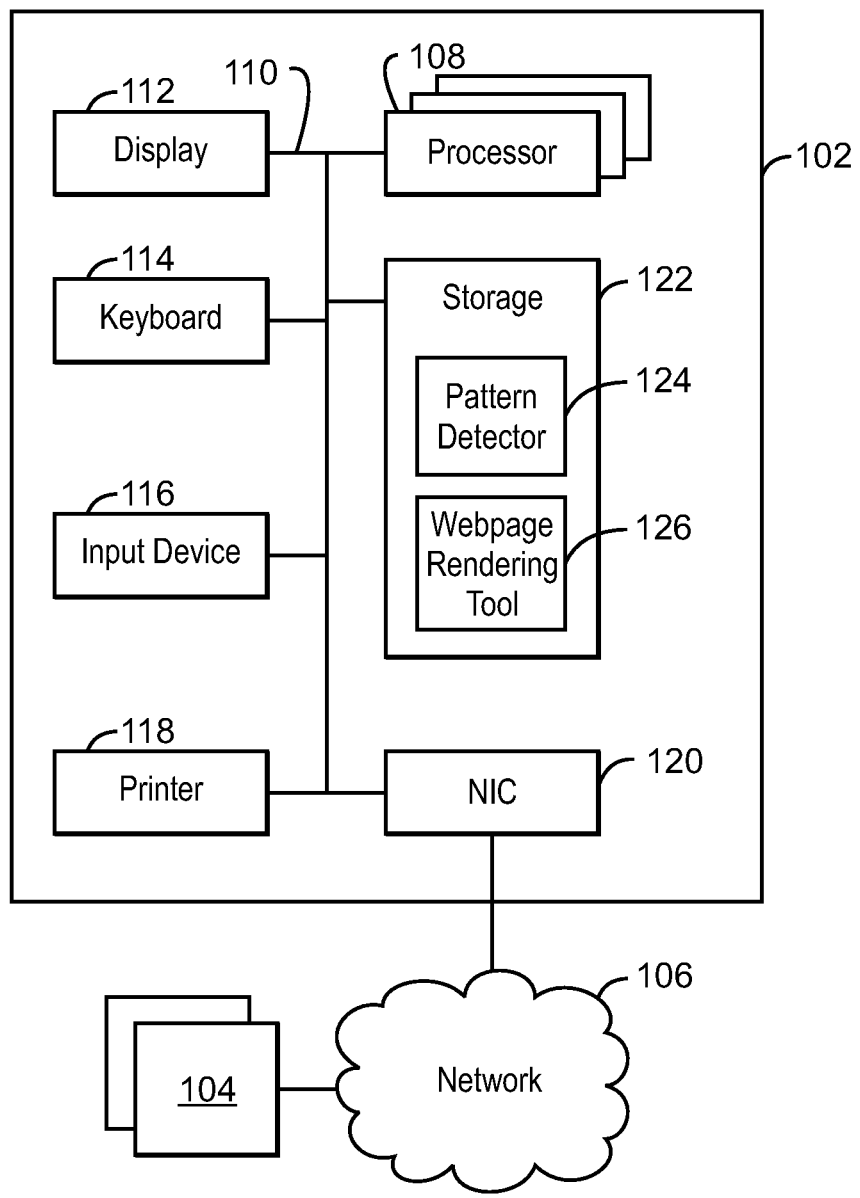
FIG. 1 is a block diagram of a system that may detect repeat patterns on a web page according to an embodiment of the present techniques.

FIG. 1 is a block diagram of a system that may detect repeat patterns on a web page according to an embodiment of the present techniques. The system is generally referred to by the reference number 100. Those of ordinary skill in the art will appreciate that the functional blocks and devices shown in FIG. 1 may comprise hardware elements including circuitry, software elements including computer code stored on a tangible, machine-readable medium, or a combination of both hardware and software elements. Additionally, the functional blocks and devices of the system 100 are but one example of functional blocks and devices that may be implemented in an embodiment. Those of ordinary skill in the art would readily be able to define specific functional blocks based on design considerations for a particular electronic device.

The system 100 may include a server 102, and one or more client computers 104, in communication over a network 106. As illustrated in FIG. 1, the server 102 may include one or more processors 108 which may be connected through a bus 110 to a display 112, a keyboard 114, one or more input devices 116, and an output device, such as a printer 118. The input devices 116 may include devices such as a mouse or touch screen. The processors 108 may include a single core, multiple cores, or a cluster of cores in a cloud computing architecture. The server 102 may also be connected through the bus 110 to a network interface card (NIC) 120. The NIC 120 may connect the server 102 to the network 106.

The network 106 may be a local area network (LAN), a wide area network (WAN), or another network configuration. The network 106 may include routers, switches, modems, or any other kind of interface device used for interconnection. The network 106 may connect to several client computers 104. Through the network 106, several client computers 104 may connect to the server 102. The client computers 104 may be similarly structured as the server 102.

The server 102 may have other units operatively coupled to the processor 108 through the bus 110. These units may include tangible, machine-readable storage media, such as storage 122. The storage 122 may include any combinations of hard drives, read-only memory (ROM), random access memory (RAM), RAM drives, flash drives, optical drives, cache memory, and the like. Storage 122 may include a pattern detector 124 and a web page rendering tool 126. The pattern detector 124 may generate a DOM-tree from a web page. The web page may be accessed using the network 106. The web page may be rendered on display 112 using a web browser or a web page rendering tool 126. The web page rendering tool 126 may allow a web designer to verify aspects of a web site design.

The pattern detector 124 may also generate a signal based on the DOM-tree and a node list. The node list is a listing of nodes within the DOM-tree in the order that they are visited, or traversed, within the DOM-tree. The pattern detector 124 may also analyze the signal and select nodes within the signal to form a periodic wave. From the periodic wave, the pattern detector 124 may detect repeat patterns using the periodic wave and the nodes.

Figure 2:
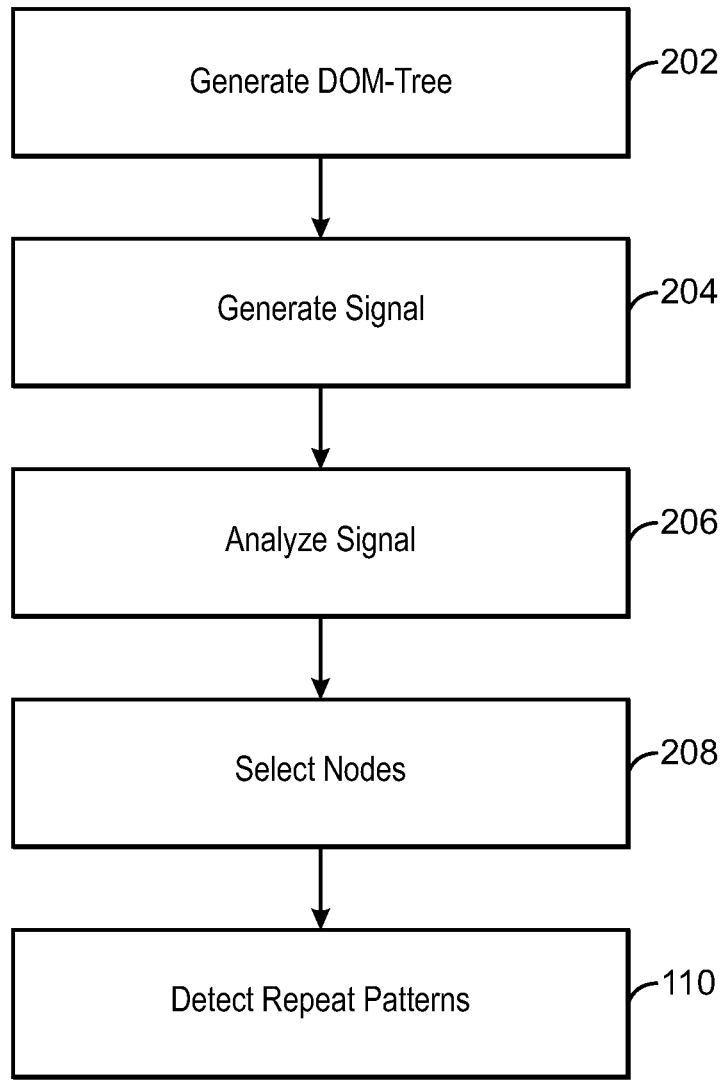
FIG. 2 is a process flow diagram for a method of detecting repeat patterns within a web page according to an embodiment of the present techniques.

FIG. 2 is a process flow diagram for a method 200 of detecting repeat patterns within a web page according to an embodiment of the present techniques. At block 202, a DOM-tree may be generated. A web page rendering tool such as the web page rendering tool 126 (FIG. 1) may be used to generate the DOM-tree of a web page.

At block 204, a signal may be generated. The signal may be based on the DOM-tree by traversing the DOM-tree using any tree traversal method, such as preorder traversal. In general, tree traversal refers to a process of visiting each node in a tree data structure in a methodical manner. The traversal process may vary depending on the order in which each node is visited, or traversed. When traversing a tree data structure in preorder, the root node is visited first, followed by the left sub-tree then the right sub-tree.

Figure 5:
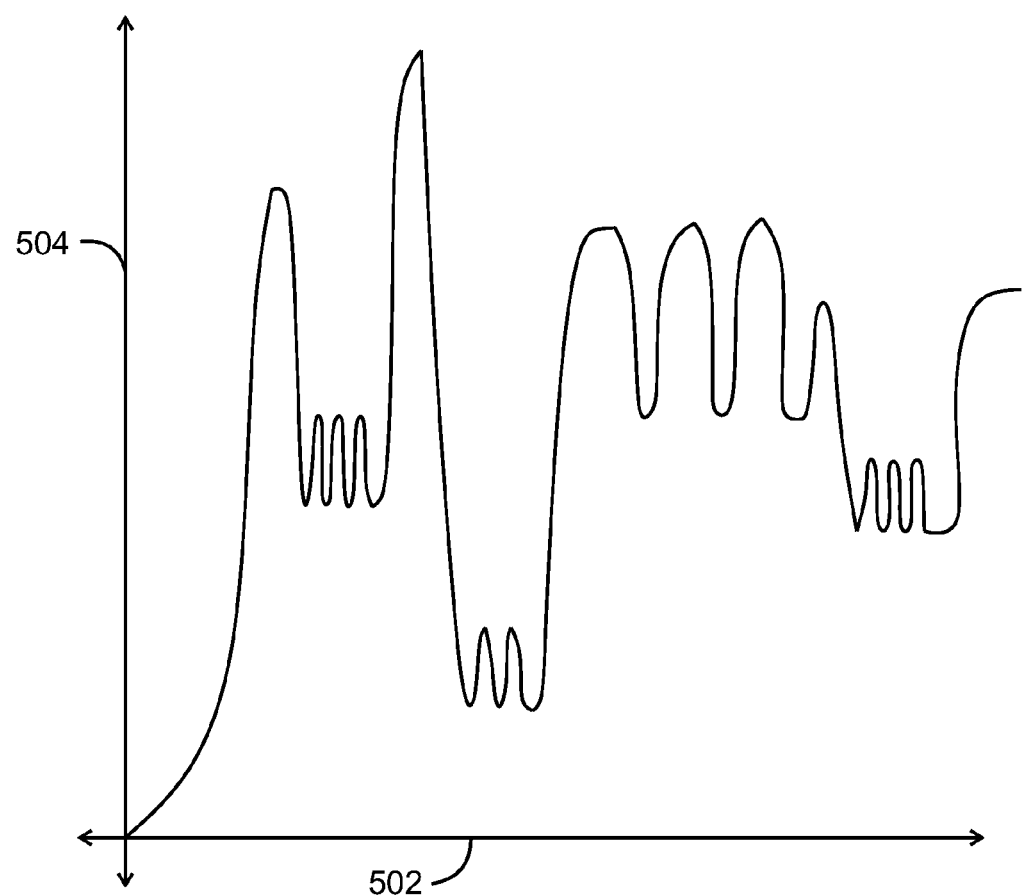
FIG. 5 is a diagram showing a 1D signal for a web page according to an embodiment of the present techniques.

By traversing the DOM-tree, a node list of the DOM-tree is obtained. As noted above, the node list is a listing of nodes in the order that they were traversed within the DOM-tree. Within the DOM-tree, the leaf nodes may correspond to actual web page content information such as text, images, and video. Other sub-tree nodes, such as nodes with children, contain structure and style information of the web page. The node list may include a node depth that represents the depth of each node within the DOM-tree. The leaf nodes in the node list may be used with the node depth obtained from the DOM-tree to form a 1D signal. For 2D signal, the signal may correspond to the node depth and a node property score. A 1D signal is shown in FIG. 5 and further described herein.

Additionally, a node property score may be used to optimize the 1D signal. The node's property score may be computed by setting scores for the properties of a node, including but not limited to tag information, text font, and location coordinates. A tag may correspond to coding instructions embedded within the markup language document. A web browser may read the tags in order to render the web page on a display, such as the display 112 (FIG. 1). The scores of different properties may be added together to calculate the node property score. The node property score may also be calculated by generating the hash value of a tag string as its score. To optimize the 1D signal, the node depth may be multiplied by the node property score to form the 1D signal.

At block 206, the signal may be analyzed. The signal may be a 1D or 2D signal, and may be analyzed using techniques including but not limited to FFT, DWT, or autocorrelation. Signal analysis may transform the signal into the time and frequency domain, where the repeated frequency values may be used to extract the periodic wave. The results of the signal analysis may be recorded by location, wave length, and period of the signal. The recorded results may be used to form a periodic wave.

At block 208, sub-tree nodes may be selected. For each "wave" of the extracted periodic wave, the smallest sub-tree of the DOM-tree is found that includes all leaf nodes that correspond to that particular wave. In order to select each sub-tree, the extracted periodic wave may be transformed from the time and frequency domain back to the 1D signal and compared to the original DOM-tree.

Nodes that do not convey any information, or nodes that do not meet a particular threshold, may be filtered out or ignored. For example, by using a web page rendering tool to generate a bounding box for each node, a threshold may be used to ignore nodes less than ten pixels in height or width. Typically, such a small node has little useful web page content.

The parent or root node for each sub-tree found that contains the leaf nodes of a particular wave of the periodic wave can be used to structure the leaf nodes found in the repeat patterns. As noted above, leaf nodes typically contain the content of the web page, while nodes with children may contain structure and style information. The structure and style information found in the parent node and other sub-tree nodes may be used to structure the content found in the leaf nodes.

At block 210, the repeat patterns are detected. Within each sub-tree found, the child nodes may form the repeat pattern. By detecting repeat patterns, the web page may be robustly segmented, even when some patterns do not completely match the actual repeating pattern. In this manner, the segmented web page can be used to render the actual content of the web page in scenarios where rendering all of the web page segments can be undesirable, such as on a small display device or a print device.

Figure 3:
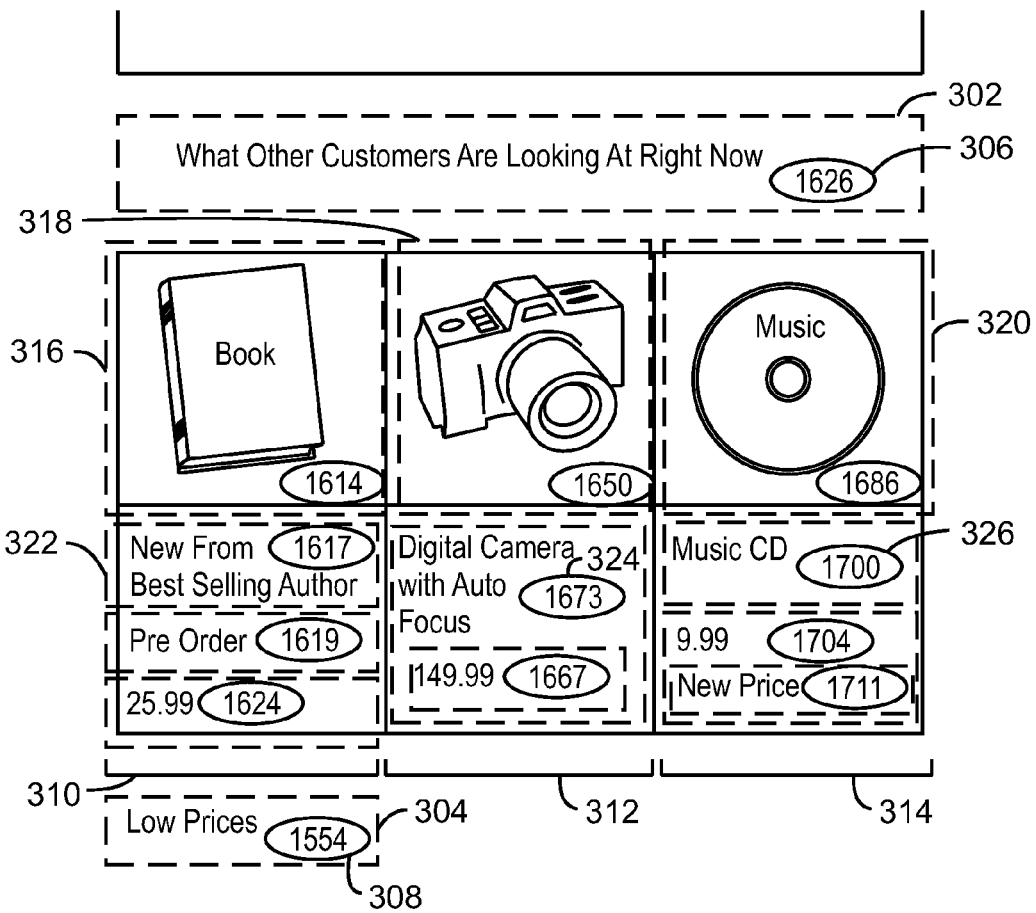
FIG. 3 is a diagram showing a portion of a web page with nodes according to an embodiment of the present techniques.

FIG. 3 is a diagram showing a portion of a web page 300 with nodes according to an embodiment of the present techniques. Nodes in FIG. 3 are surrounded by a dotted rectangle that represents the boundary rectangle for each node. Repeat patterns are located at nodes 302 and 304, as determined by techniques described herein. A number for each node is circled within the node's boundary rectangle, such as number 1626 at reference number 306, and number 1554 at reference number 308. The number of each node is the traversal order of the node within the DOM-tree, and each node has the same number in both FIGS. 3 and 4. For ease of description, only a few nodes are displayed. However, web page 300 may have any number of nodes.

The markup language used to render the nodes at reference numbers 310, 312, and 314 is similar, giving the nodes similar node properties. For example, the images at nodes 316, 318, and 320 have the same size. Likewise, the text font for nodes 322, 324, and 326 is the same. Thus, it is apparent that a fixed template is used within the markup language to render the content at reference numbers 310, 312, and 314, and reference numbers 310, 312, and 314 form a repeat pattern.

The pattern at reference number 310 contains four nodes, while the pattern at reference numbers 312 and 314 each contain three nodes. Even though the pattern at reference number 310 may have less nodes than the pattern at reference numbers 312 and 314, the present techniques can recognize the similarity between the patterns and detect the repeat pattern.

Figure 4:
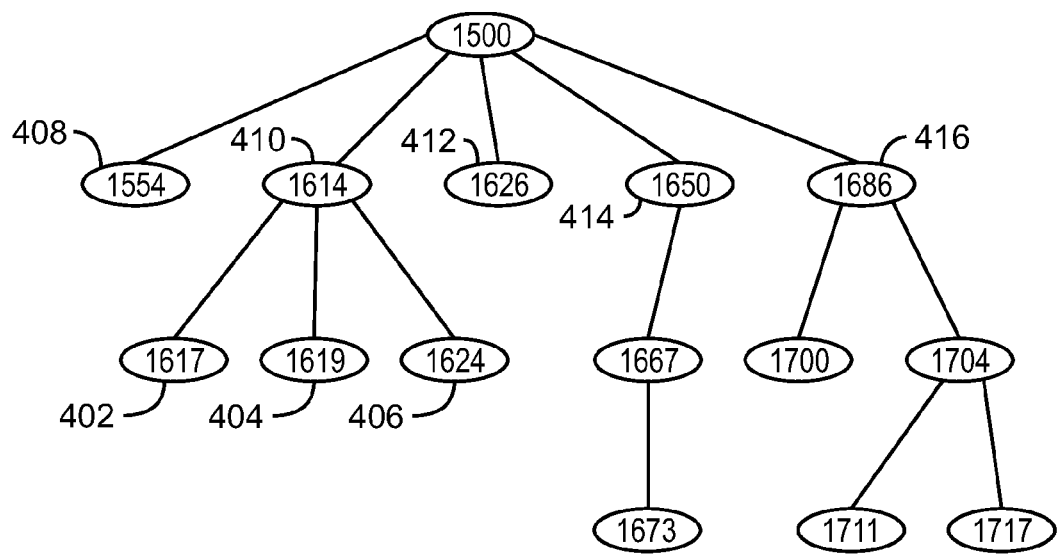
FIG. 4 is a diagram showing a portion of a DOM-tree of a web page according to an embodiment of the present techniques.

FIG. 4 is a diagram showing a portion of a DOM-tree 400 of a web page according to an embodiment of the present techniques. The DOM-tree may be generated according to the techniques described at block 202 (FIG. 2). The DOM-tree 400 is based on the web page 300 (FIG. 3). Repeat patterns of the web page 300 (FIG. 3) can be detected from analyzing a signal generated from the DOM-tree 400.

The DOM-tree 400 includes each node from web page 300 (FIG. 3), as indicated by the circled number of each node. The leaf nodes of the DOM-tree, like the leaf node at reference numbers 402, 404, and 406, may be used to generate a signal as described at block 204 (FIG. 2). After a periodic wave is found through signal analysis described at block 206 (FIG. 2), the periodic wave may be used to select sub-tree nodes as described at block 208 (FIG. 2). The smallest sub-tree of the DOM-tree may be found that includes all leaf nodes that correspond to each particular wave. For example, a "wave" of a periodic wave may correspond to leaf nodes 402, 404, and 406. The sub-tree node 410 is the smallest sub-tree node that includes leaf nodes 402, 404, and 406. Similarly, the smallest sub-tree nodes that include other leaf nodes corresponding to waves of the periodic wave may be nodes from the DOM-tree such as nodes 410, 412, 414, and 416.

FIG. 5 is a diagram showing a 1D signal 500 for a web page according to an embodiment of the present techniques. The 1D signal 500 was generated from the DOM-tree 400 (FIG. 4) by using the leaf nodes in the DOM-tree and a node list. The x-coordinates, as indicated by the x-axis 502, correspond to the traversal order of the nodes in the DOM-tree. The y-coordinates, as indicated by the y-axis 504, correspond to the node depth of the same node within the DOM-tree.

Figure 6:
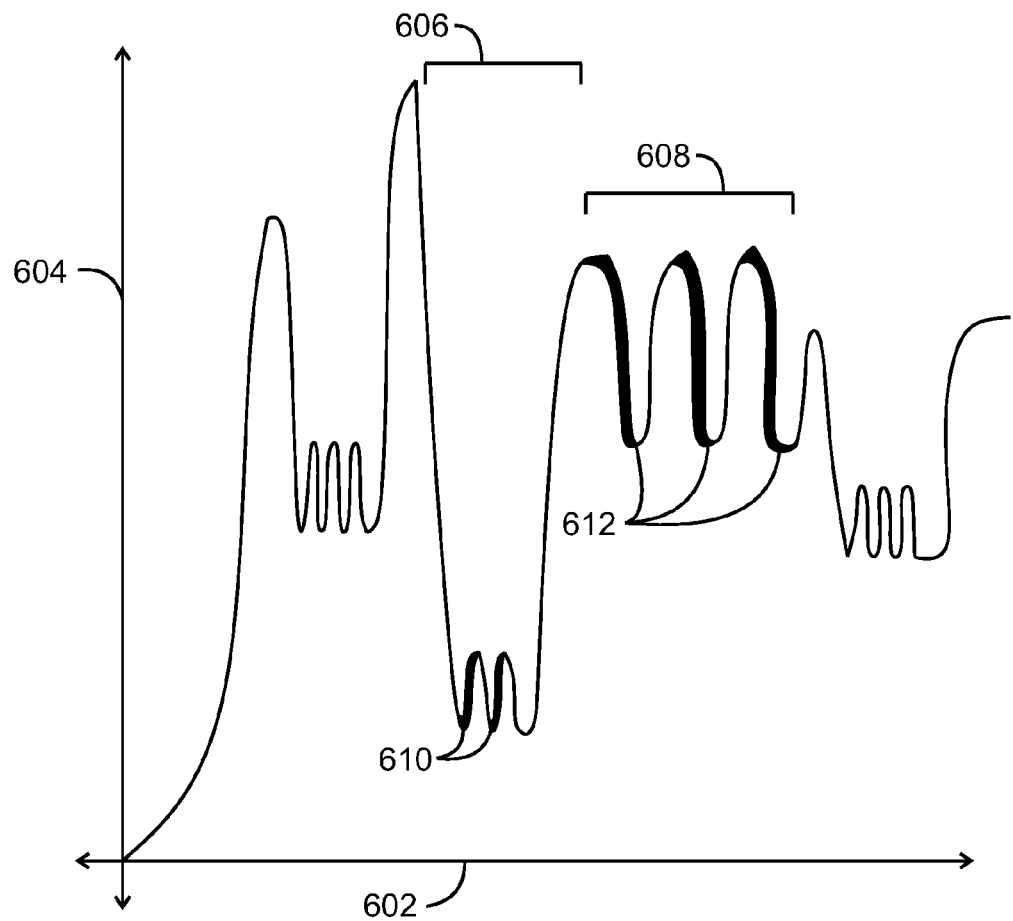
FIG. 6 is a block diagram showing the results of signal analysis on a signal according to an embodiment of the present techniques.

FIG. 6 is a diagram showing the results of signal analysis on a signal 600 according to an embodiment of the present techniques. The signal 600 shows the result of signal analysis on signal 500 (FIG. 5) according to techniques described at block 206 (FIG. 2). The signal 600 has an x-axis 602 and a y-axis 604. Through signal analysis, two periodic waves may be found at reference numbers 606 and 608.

Within the periodic wave at reference number 606, two repeat patterns may be found at reference number 610. The two repeat patterns at reference number 610 may be transformed from the time and frequency domain back to the 1D signal. The nodes found in the periodic wave may be used to find the nodes at reference numbers 408 and 412 (FIG. 4) in the DOM-tree, which correspond to the repeat pattern at reference numbers 302 and 304 (FIG. 3). Similarly, three repeat patterns 612 may be found in the periodic wave at reference number 608. The three repeat patterns 612 may be used to find sub-trees at nodes 410, 414, and 416 (FIG. 4), which correspond to the repeat pattern at reference numbers 316, 318, and 320 (FIG. 3).

Figure 7:
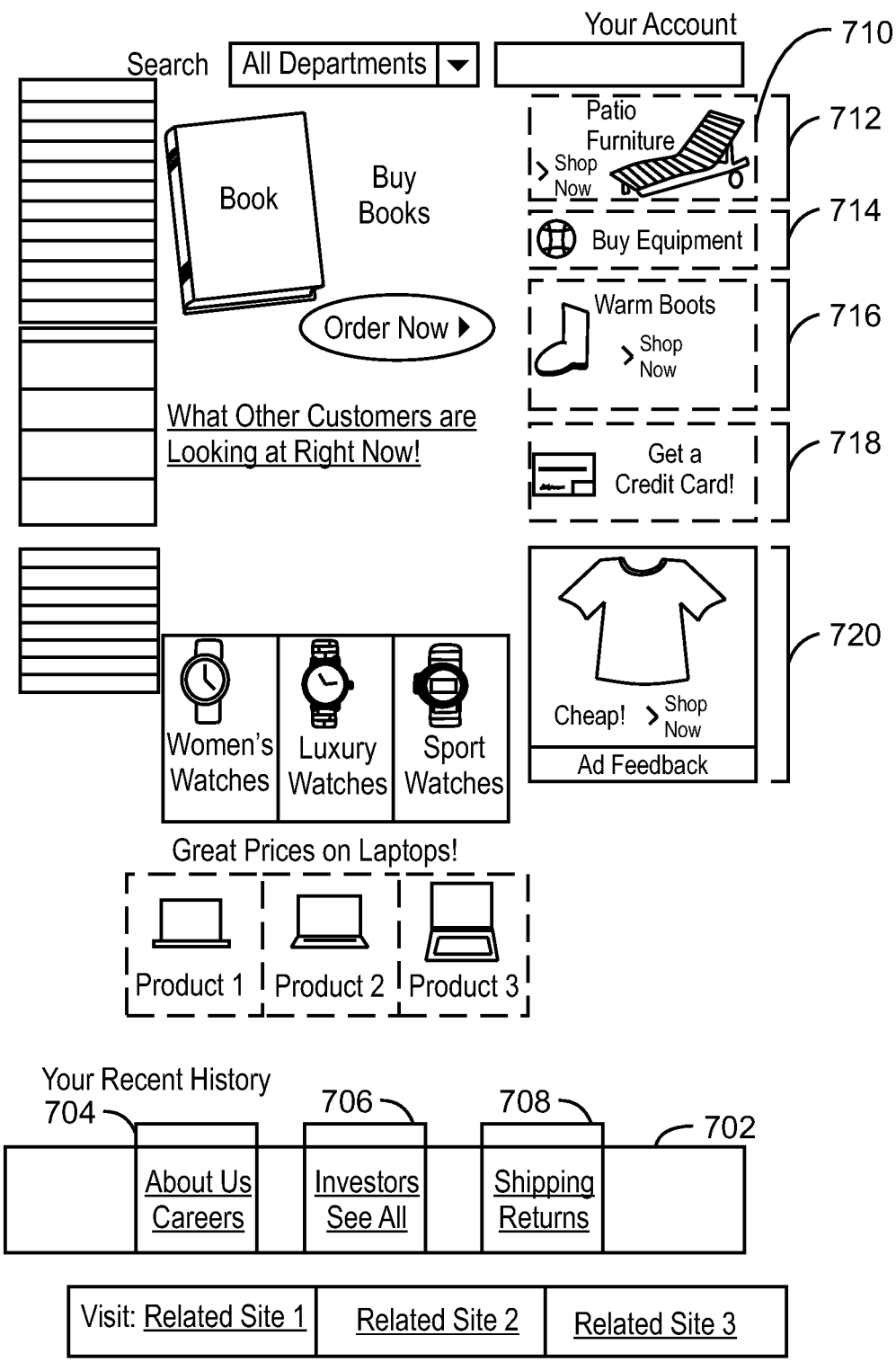
FIG. 7 is a diagram showing the marked selection result for the detected repeat patterns for a web page according to an embodiment of the present techniques.

FIG. 7 is a diagram showing the marked selection result for the detected repeat patterns for a web page 700 according to an embodiment of the present techniques. The present techniques are able to discover several repeat patterns on the web page 700. For example, the section at reference number 702 contains six hyperlinks corresponding to the About Us, Careers, Investors, See All, Shipping, and Return links, which are grouped into three sections. The patterns at reference number 702 repeat three times, as indicated by reference numbers 704, 706, and 708. Reference numbers 704, 706, and 708 show a repeat pattern of the web page. Likewise, within the dotted lines at reference number 710, there are five repeating patterns 712, 714, 716, 718, and 720 that correspond to various advertisements.

Figure 8:
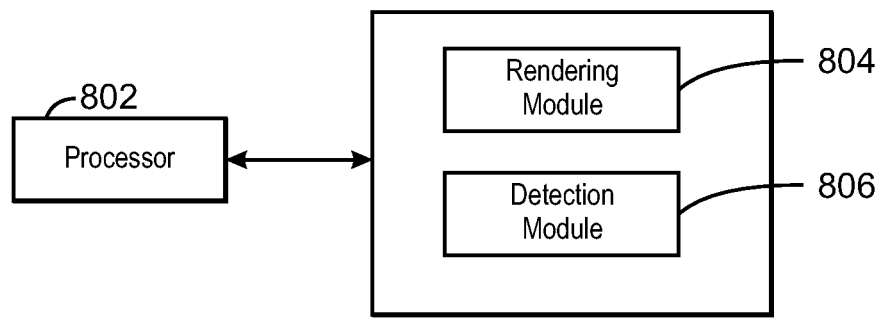
FIG. 8 is a block diagram showing a non-transitory, computer-readable medium that stores code for detecting repeat patterns on a web page according to an embodiment of the present techniques.

FIG. 8 is a block diagram showing a non-transitory, computer-readable medium that stores code for detecting repeat patterns on a web page according to an embodiment of the present techniques. The non-transitory, computer-readable medium is generally referred to by the reference number 800.

The non-transitory, computer-readable medium 800 may correspond to any typical storage device that stores computer-implemented instructions, such as programming code or the like. For example, the non-transitory, computer-readable medium 800 may include one or more of a non-volatile memory, a volatile memory, and/or one or more storage devices.

Examples of non-volatile memory include, but are not limited to, electrically erasable programmable read only memory (EEPROM) and read only memory (ROM). Examples of volatile memory include, but are not limited to, static random access memory (SRAM), and dynamic random access memory (DRAM). Examples of storage devices include, but are not limited to, hard disks, compact disc drives, digital versatile disc drives, and flash memory devices.

A processor 802 generally retrieves and executes the computer-implemented instructions stored in the non-transitory, computer-readable medium 800 for detecting repeat patterns on a web page. At block 804, a rendering module may generate a DOM-tree and generate a signal based on the DOM-tree and a node list. The rendering module may analyze the signal, and select nodes within the signal to form a periodic wave. At block 806, a detection module may detect a repeat pattern using the periodic wave and the nodes from the rendering module.

What is claimed is:

1. A system for detecting a repeat pattern on a web page, the system comprising:
    a processor that is adapted to execute stored instructions; and
    a memory device that stores instructions, the memory device comprising processor-executable code, that when executed by the processor, is adapted to:
    generate a DOM-tree;
    generate a signal based on the DOM-tree and a node list;
    analyze the signal;
    select nodes within the signal to form a periodic wave; and
    detect a repeat pattern using the periodic wave and the nodes.

2. The system recited in claim 1, wherein the node list includes a node depth for each node within the DOM-tree.

3. The system recited in claim 1, wherein the memory stores processor-executable code adapted to generate the signal based on the DOM-tree and the node list by:
    obtaining the node list from the DOM-tree, wherein the node list includes a node depth for each node within the DOM-tree; and
    generating a 1D signal based on a leaf node in the node list and the node depth, wherein each of the nodes corresponds to a point on the signal.

4. The system recited in claim 1, wherein the memory stores processor-executable code adapted to generate a signal based on the DOM-tree and the node list by:

obtaining the node list from the DOM-tree, wherein the node list includes a node depth for each node within the DOM-tree; and generating a 1D signal based on a leaf node in the node list and the node depth multiplied by a node property score, wherein each of the nodes corresponds to a point on the signal.

5. The system recited in claim 1, wherein the memory stores processor executable code adapted to generate a signal based on the DOM-tree and the node list by:

obtaining the node list from the DOM-tree, wherein the node list includes a node depth for each node within the DOM-tree; and generating a 2D signal based on a leaf node in the node list, the node depth, and a node property score, wherein each of the nodes corresponds to a point on the signal.

6. The system recited in claim 1, wherein the memory stores processor executable code adapted to analyze the signal using time-frequency analysis techniques such as Fast Fourier Transform, Digital Wavelet Transform, or Autocorrelation.

7. The system recited in claim 1, wherein a periodic wave is formed by filtering out nodes that do not convey any information or that do not meet a particular threshold.

8. A method of detecting a repeat pattern on a web page, the method comprising:

generating a DOM-tree from the web page rendered by a web browser or a web page rendering tool;

generating a signal based on the DOM-tree and a node list;

analyzing the signal;

selecting nodes within the signal to form a periodic wave; and detecting a repeat pattern using the periodic wave and the nodes.

9. The method recited in claim 8, wherein the node list includes a node depth for each node within the DOM-tree.

10. The method recited in claim 8, wherein generating a signal based on the DOM-tree and the node list comprises:

obtaining the node list from the DOM-tree, wherein the node list includes a node depth for each node within the DOM-tree; and generating a 1D signal based on a leaf node in the node list and the node depth, wherein each of the nodes corresponds to a point on the signal.

11. The method recited in claim 8, wherein generating a signal based on the DOM-tree and the node list comprises:

obtaining the node list from the DOM-tree, wherein the node list includes a node depth for each node within the DOM-tree; and generating a 1D signal based on a leaf node in the node list and the node depth multiplied by a node property score, wherein each of the nodes corresponds to a point on the signal.

12. The method recited in claim 8, wherein generating a signal based on the DOM-tree and the node list comprises:

obtaining the node list from the DOM-tree, wherein the node list includes a node depth for each node within the DOM-tree; and generating a 2D signal based on a leaf node in the node list, the node depth, and a node property score, wherein each of the nodes corresponds to a point on the signal.

13. The method recited in claim 8, the signal is analyzed using time-frequency analysis techniques such as Fast Fourier Transform, Digital Wavelet Transform, or Autocorrelation.

14. The method recited in claim 8, wherein a periodic wave is formed by filtering out nodes that do not convey any information or that do not meet a particular threshold.

15. A non-transitory, computer-readable medium, comprising code configured to direct a processor to:

generate a DOM-tree;

generate a signal based on the DOM-tree and a node list;

analyze the signal;

select nodes within the signal to form a periodic wave; and detect a repeat pattern using the periodic wave and the nodes.

16. The non-transitory, computer-readable medium recited in claim 15, wherein the non-transitory, computer-readable medium comprises code configured to direct a processor to generate a signal based on the DOM-tree and the node list by:

obtaining the node list from the DOM-tree, wherein the node list includes a node depth for each node within the DOM-tree; and generating a 1D signal based on a leaf node in the node list and the node depth, wherein each of the nodes corresponds to a point on the signal.

17. The non-transitory, computer-readable medium recited in claim 15, wherein the non-transitory, computer-readable medium comprises code configured to direct a processor to generate a signal based on the DOM-tree and the node list by:

obtaining the node list from the DOM-tree, wherein the node list includes a node depth for each node within the DOM-tree; and generating a 1D signal based on a leaf node in the node list and the node depth multiplied by a node property score, wherein each of the nodes corresponds to a point on the signal.

18. The non-transitory, computer-readable medium recited in claim 15, wherein the non-transitory, computer-readable medium comprises code configured to direct a processor to generate a signal based on the DOM-tree and the node list by:

obtaining the node list from the DOM-tree, wherein the node list includes a node depth for each node within the DOM-tree; and generating a 2D signal based on a leaf node in the node, the node depth, and a node property score, wherein each of the nodes corresponds to a point on the signal.

19. The non-transitory, computer-readable medium recited in claim 15, wherein the non-transitory, computer-readable medium comprises code configured to direct a processor to analyze the signal with time-frequency analysis techniques such as Fast Fourier Transform, Digital Wavelet Transform, or Autocorrelation.

20. The non-transitory, computer-readable medium recited in claim 15, wherein the non-transitory, computer-readable medium comprises code configured to direct a processor to select nodes within the signal to form a periodic wave by filtering out nodes that do not convey any information or that do not meet a particular threshold.

* * * * *